(12) United States Patent
De Ayguavives (10) Patent No.: US 12,140,733 B2
(45) Date of Patent: Nov. 12, 2024

(54) OPTICAL DEVICE WITH REDUCED REFLECTION IN DEEP RED, NEAR INFRARED AND VISIBLE RANGES

(71) Applicant: Essilor International, Charenton-le-Pont (FR)

(72) Inventor: Francisco De Ayguavives, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 778 days.

(21) Appl. No.: 17/276,365

(22) PCT Filed: Sep. 16, 2019

(86) PCT No.: PCT/EP2019/074697
§ 371 (c)(1),
(2) Date: Mar. 15, 2021

(87) PCT Pub. No.: WO2020/058186
PCT Pub. Date: Mar. 26, 2020

(65) Prior Publication Data
US 2022/0035077 A1 Feb. 3, 2022

(30) Foreign Application Priority Data
Sep. 20, 2018 (EP) ..................... 18306224

(51) Int. Cl.
*G02B 1/115* (2015.01)
*G02B 5/28* (2006.01)
(Continued)

(52) U.S. Cl.
CPC .............. *G02B 1/115* (2013.01); *G02B 5/281* (2013.01); *G02C 7/022* (2013.01); *G02C 7/107* (2013.01)

(58) Field of Classification Search
CPC ........ G02B 1/115; G02B 5/281; G02C 7/022; G02C 7/107
(Continued)

(56) References Cited

U.S. PATENT DOCUMENTS 4,145,122 A * 3/1979 Rinard ...................... A61F 4/00
351/158
7,046,285 B2 5/2006 Miyagi et al.
(Continued)

FOREIGN PATENT DOCUMENTS

CN 203287550 U 11/2013
CN 103500012 A * 1/2014
(Continued)

OTHER PUBLICATIONS

English translation of Chinese Office Action issued May 7, 2022 in Chinese Patent Application No. 201980061424.X, 9 pages.
(Continued)

*Primary Examiner* — Sharrief I Broome
(74) *Attorney, Agent, or Firm* — Oblon, McClelland, Maier & Neustadt, L.L.P.

(57) ABSTRACT

This optical device comprises an ophthalmic lens and a light source emitting in the deep red and near infrared region. The ophthalmic lens has front and rear faces coated with interferential coatings. The mean reflectance of the rear interferential coating is lower than or equal to 2.5% for wavelengths ranging from 700 nm to a predetermined maximum wavelength lower than or equal to 2500 nm, at an angle of incidence lower than or equal to 45°. At an angle of incidence lower than or equal to 45°, for wavelengths ranging from 700 nm to the predetermined maximum wavelength, the mean reflectance of the front interferential coating is either lower than or equal to 2.5% if the source is directed towards the front face of the ophthalmic lens, or
(Continued)

higher than or equal to 25% if the source is directed towards the rear face of the ophthalmic lens.

20 Claims, 2 Drawing Sheets

(51) Int. Cl.
  *G02C 7/02* (2006.01)
  *G02C 7/10* (2006.01)
(58) Field of Classification Search
  USPC .................................................. 351/159.6
  See application file for complete search history.

(56) References Cited

U.S. PATENT DOCUMENTS

| | | | |
|---|---|---|---|
| 9,291,746 | B2 | 3/2016 | Avetisian, Sr. et al. |
| 9,423,529 | B2 | 8/2016 | Koyama |
| 9,910,284 | B1 | 3/2018 | Nortrup et al. |
| 9,946,339 | B2 | 4/2018 | Guo et al. |
| 10,031,349 | B2 | 7/2018 | Takahashi |
| 10,345,489 | B2 | 7/2019 | Fukaya et al. |
| 2003/0175557 | A1 | 9/2003 | Anderson et al. |
| 2010/0000591 | A1 | 1/2010 | Anderson et al. |
| 2011/0017272 | A1* | 1/2011 | Anderson ......... B32B 17/10174 |
| | | | 136/246 |
| 2012/0068913 | A1* | 3/2012 | Bar-Zeev ............ G02B 27/017 |
| | | | 345/8 |
| 2015/0241602 | A1* | 8/2015 | Avetisian, Sr. ........ G02B 1/116 |
| | | | 359/359 |
| 2016/0003982 | A1 | 1/2016 | Avetisian et al. |
| 2016/0161747 | A1* | 6/2016 | Osterhout .......... G02B 27/0176 |
| | | | 345/8 |
| 2016/0306194 | A1 | 10/2016 | Takahashi |
| 2017/0004363 | A1 | 1/2017 | Dore et al. |
| 2017/0115483 | A1 | 4/2017 | Aleem et al. |
| 2017/0192255 | A1 | 7/2017 | Santan et al. |
| 2017/0299896 | A1 | 10/2017 | Ogo et al. |
| 2017/0308160 | A1 | 10/2017 | Yoon |
| 2017/0312622 | A1 | 11/2017 | Ishihara |
| 2017/0343810 | A1* | 11/2017 | Bietry .................. G02B 27/286 |
| 2017/0343813 | A1* | 11/2017 | Bietry .................... G02B 7/003 |
| 2018/0113326 | A1 | 4/2018 | Gloege et al. |
| 2018/0129056 | A1* | 5/2018 | Nortrup ............ G02B 27/0093 |
| 2018/0149863 | A1 | 5/2018 | Aleem et al. |
| 2019/0004281 | A1 | 1/2019 | Shi |
| 2019/0302314 | A1 | 10/2019 | Avetisian, Sr. et al. |

FOREIGN PATENT DOCUMENTS

| | | |
|---|---|---|
| CN | 107710048 A | 2/2018 |
| CN | 107787473 A | 3/2018 |
| CN | 106164745 B | 4/2020 |
| JP | 04-366801 A | 12/1992 |
| JP | 2012-255984 A | 12/2012 |
| JP | 2015-148643 A | 8/2015 |
| JP | 2017-68096 A | 4/2017 |
| JP | 2017-537366 A | 12/2017 |
| KR | 10-2016-0117459 A | 10/2016 |
| KR | 10-2017-0080630 A | 7/2017 |
| KR | 10-2018-0086437 | 7/2018 |
| WO | WO 2013/122253 A1 | 8/2013 |
| WO | WO 2017/191254 A1 | 11/2017 |
| WO | WO 2018/070379 A1 | 4/2018 |

OTHER PUBLICATIONS

Korean Office Action issued Jan. 19, 2023 in Korean Application 10-2021-7006968 (with English Translation), 10 pages.
European Office Action issued Oct. 21, 2021 in European Patent Application No. 18 306 224.9, 13 pages.
International Search Report issued Jan. 23, 2020 in PCT/EP2019/074697 filed Sep. 16, 2019.
Extended European Search Report issued Jul. 5, 2019 in European Patent Application No. 18306224.9 filed Sep. 20, 2018.
Japanese Office Action issue on May 8, 2023 in Japanese Patent Application No. 2021-513920 (submitting English translation only), 4 pages.
English translation of Combined Chinese Office Action and Search Report issued Jan. 4, 2022 in Patent Application No. 201980061424.X, 11 pages.

* cited by examiner

OPTICAL DEVICE WITH REDUCED REFLECTION IN DEEP RED, NEAR INFRARED AND VISIBLE RANGES

FIELD OF THE INVENTION

The present invention relates to an optical device comprising an ophthalmic lens and a light source emitting in the deep red and near infrared (NIR) region i.e. at wavelengths ranging from 700 nm to 2500 nm and having strongly reduced reflection in the deep red, NIR and visible ranges. The optical device may for example be comprised in an augmented reality device, in a virtual reality device or in an eye tracking device.

BACKGROUND OF THE INVENTION

The NIR range is commonly used for light illuminating the eye for the purpose of eye tracking, because NIR light is not visible by the user and, at the same time, allows very good contrast on the pupil, which makes it possible to obtain high accuracy and high reliability of eye gaze direction or eye motion measurements, or of any other measurements such as relating to pupil size and position, eye reflections on cornea surfaces, eye lens surfaces, eye lid, etc.

Such measurements may be made through specific spectacles, comprising a deep red and NIR light source and a video camera, in addition to ophthalmic lenses.

However, when the deep red and NIR light source sends light towards the eye of a user wearing such equipment, multiple reflections occur on the faces of the ophthalmic lenses. Such multiple reflections generate noise for the detector of the camera, which will then be unable to properly locate the pupil.

Thus, it is necessary to limit the deep red and NIR light reflections on the ophthalmic lenses.

Document US-A-2015 138451 discloses eye tracking devices using NIR light, where the NIR reflectance of some optical surfaces is reduced for incidence angles of 35° and 75°.

Nevertheless, the performances at lower incidence angles are unknown and the characteristics of the optical surfaces having reduced NIR reflectance such as the number of layers, the materials used, their refractive indices or their thicknesses, are not disclosed.

Moreover, the reflectance of the front optical surface concerned should be different depending on the direction of the NIR light source with respect to the optical surface, namely, depending on whether the NIR light source is directed towards the front optical surface or the rear optical surface. The above-cited document does not address this issue either.

SUMMARY OF THE INVENTION

An object of the invention is to overcome the above-mentioned drawbacks of the prior art.

To that end, the invention provides an optical device comprising an ophthalmic lens and a light source emitting in the deep red and near infrared region, the ophthalmic lens having a front face coated with a front interferential coating and a rear face coated with a rear interferential coating, the optical device being remarkable in that:

the mean reflectance of the rear interferential coating is lower than or equal to 2.5% for wavelengths ranging from 700 nm to a predetermined maximum wavelength lower than or equal to 2500 nm, at an angle of incidence lower than or equal to 45°; and the mean reflectance of the front interferential coating is:
either lower than or equal to 2.5% for wavelengths ranging from 700 nm to the predetermined maximum wavelength, at an angle of incidence lower than or equal to 45°, if the source is directed towards the front face of the ophthalmic lens,
or higher than or equal to 25% for wavelengths ranging from 700 nm to the predetermined maximum wavelength, at an angle of incidence lower than or equal to 45°, if the source is directed towards the rear face of the ophthalmic lens.

Therefore, the optical device according to the invention comprises highly efficient antireflective coatings in the deep red and NIR range at an angle of incidence lower than or equal to 45°, on one hand, on the rear face of the ophthalmic lens and on the other hand, on the front face of the ophthalmic lens if the deep red and NIR light source is directed towards the front face of the ophthalmic lens, while comprising a strongly reflective coating on the front face of the ophthalmic lens if the deep red and NIR light source is directed towards the rear face of the ophthalmic lens.

The invention also provides an augmented reality device, a virtual reality device and an eye tracking device, each of those devices comprising such an optical device.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about".

Also unless otherwise indicated, the indication of an interval of values "from X to Y" or "between X and Y", according to the present invention, means including the values of X and Y.

In the present application, when an optical device comprises one or more coatings onto the surface thereof, the expression "to deposit a layer or a coating onto the device" is intended to mean that a layer or a coating is deposited onto the external (exposed) surface of the outer coating of the device, that is to say its coating that is the most distant from the substrate.

A coating that is said to be "on" a substrate or deposited "onto" a substrate is defined as a coating which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with the substrate.

As used herein, the rear (or the inner) face of the substrate is intended to mean the face which, when using the device, is the nearest from the wearer's eye. It is generally a concave face. On the contrary, the front face of the substrate, is the face which, when using the device, is the most distant from the wearer's eye. It is generally a convex face.

In addition, the "angle of incidence (symbol $\theta$)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b*. Generally the angle of incidence changes from 0° (normal incidence) to 90° (grazing incidence). The usual range for angle of incidence is from 0° to 75°.

The colorimetric coefficients of the optical device of the invention in the international colorimetric system CIE L*a*b* are calculated between 380 nm and 780 nm, taking the standard illuminant D65 and the observer into account (angle of 10°). The observer is a "standard observer" as defined in the international colorimetric system CIE L*a*b*.

Generally speaking, the interferential coatings of the optical device according to the invention, which will be called "the antireflective coating" or "the reflective coating", depending on the configuration described, may be deposited onto any substrate, and preferably onto organic lens substrates, for example a thermoplastic or thermosetting plastic material. Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective or reflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following, a substrate means either a bare substrate or such a coated substrate.

Prior to depositing the antireflective or reflective coating, the surface of said substrate is usually submitted to a physical or chemical surface activating treatment, so as to reinforce the adhesion of the antireflective or reflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma.

It may also be an acid or basic treatment and/or a solvent-based treatment (water, hydrogen peroxide or any organic solvent).

The optical device according to the invention comprises an ophthalmic lens and a light source emitting in the deep red and near infrared region, that is to say at wavelengths ranging from 700 nm to 2500 nm.

The light source can for instance be a light-emitting diode (LED).

In order to detect light emitted from that source, it is possible to use a video camera sensitive to NIR wavelengths, for instance a camera of the CCD (Charge-Coupled Device) type or of the CMOS (Complementary Metal Oxide Semiconductor) type, without any deep red and NIR filter. As a variant, instead of a camera, an array of single deep red and NIR sensors or a PSD (Position Sensitive Detector) sensor or any other appropriate sensor can be used.

Figure 1:
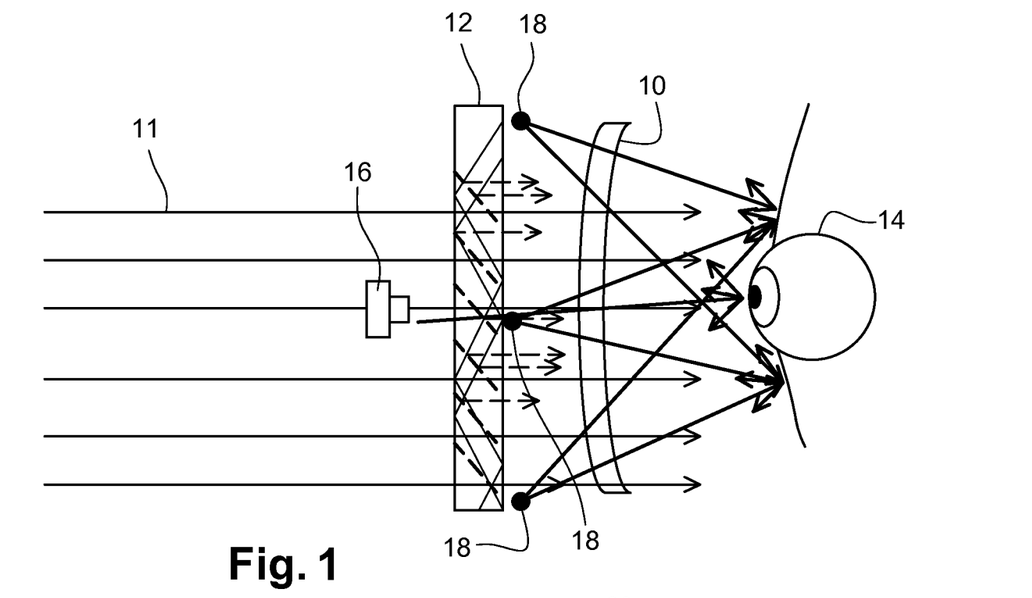
FIG. 1 is a schematic view of an augmented reality device or virtual reality device comprising an optical device according to the present invention, in a particular embodiment.

FIG. 1 shows a non-limiting example of an arrangement in an augmented reality device or virtual reality device comprising an optical device according to the invention.

The optical device comprises an ophthalmic lens 10 placed between, on one hand, the eye 14 of a user and on the other hand, a light optical element 12. The light optical element 12 can be for instance a waveguide having coupling means for coupling light into, and outcoupling means for outcoupling light towards the eye 14 of the user, so that the user can perceive a virtual image.

The horizontal arrows 11 going through the light optical element 12 and through the ophthalmic lens 10 represent light coming from the environment.

A deep red and NIR eye tracker is also included in the augmented reality device or virtual reality device. The deep red and NIR eye tracker comprises a deep red and NIR camera 16 and at least one deep red and NIR light source 18, which source 18 is comprised in the optical device according to the invention.

In the particular embodiment shown in FIG. 1, the sources 18 are placed between the light optical element 12 and the ophthalmic lens 10, while the camera 16 is placed in front of the light optical element 12.

As a variant, the camera 16 and the sources 18 could be placed in front of the light optical element 12.

As another variant, the light optical element 12 could be used both for providing a virtual image and for providing light illumination. Light reflected by the eye 14 can then come back to the light optical element 12 and be redirected to a deep red and NIR light sensor.

The ophthalmic lens 10 can provide an optical function to the user.

It can for instance be a corrective lens, namely, a power lens of the spherical, cylindrical and/or addition type for an ametropic user, for treating myopia, hypermetropia, astigmatism and/or presbyopia. The lens 10 can have a constant power, so that it provides power as a single vision lens would do, or it can be a progressive lens having variable power.

It can also comprise a filter that can be integrated on a substrate, or on a coating, or on a film. For instance, the filter may be designed to cut some polarization and keep the polarization corresponding to the virtual image polarization. In this way, the contrast of the virtual image can be increased, because the parasitic light from the environment is reduced, while the intensity of the virtual image is maintained. The lens may for example include a polarization film such as a TAC-PVA-TAC (triacetyl cellulose-poly(vinyl alcohol)-triacetyl cellulose) film that is put on a casting mold. It can be a specific filter, having for example reduced transmission for wavelengths different from the virtual image wavelengths, while keeping higher transmission for wavelengths corresponding to the light optical element 12.

The lens 10 includes a deep red and NIR antireflective coating, at least on one of its faces and preferably on both its front face and its rear face.

The antireflective coating will be designed so that reflection in the deep red and NIR range is reduced, so that the camera 16 receives little light coming from reflection on the lens 10.

Figure 2:
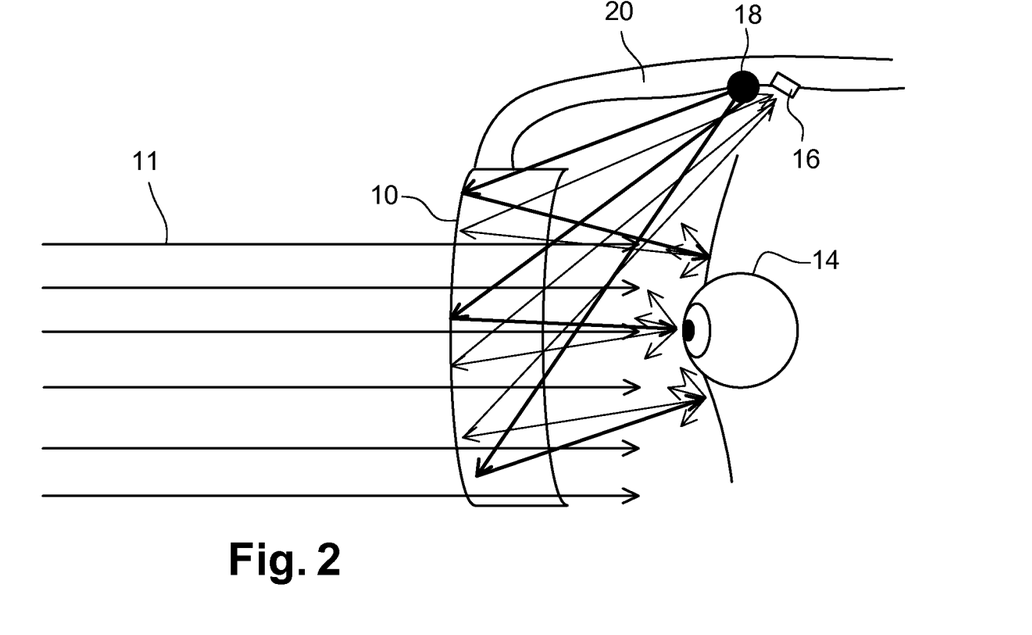
FIG. 2 is a schematic view of an eye tracking device comprising an optical device according to the present invention, in a particular embodiment.

FIG. 2 shows a non-limiting example of an arrangement in an eye tracking device comprising an optical device according to the invention.

In this embodiment, the optical device may be implemented as eyewear equipment having a frame 20 and may be used for eye tracking with no virtual image display.

It may for instance be used for detecting fatigue when driving, via eye blinking detection, or for eye health monitoring.

In this embodiment, contrary to the embodiment of FIG. 1, the deep red and NIR light source 18 is directed towards the rear face of the lens 10, so that the lens 10 may have an antireflective coating on its rear face only, while the front face of the lens 10 has a deep red and NIR light reflective coating. As a variant, the reflective coating may be replaced by a reflective element embedded within the lens 10, such as a MOF (Multilayered Optical Filter), for example.

As shown in FIG. 2, the eyewear equipment has a specific deep red and NIR light source 18 that may be placed on the temple of the user or on the frame 20. The eyewear equipment also has a camera 16 located close to the source 18.

The light emitted by the source 18 is at least partially reflected by the front surface of the eye 14, so as to illuminate it.

The deep red and NIR light is diffused and reflected by the eye 14 and is propagated back towards the reflective front face of the lens 10 and then towards the camera 16.

Similarly to the embodiment of FIG. 1, the rear face of the lens 10 has a deep red and NIR light antireflective coating, so that when light is propagated back from the eye 14 towards the lens 10, no or little reflection occurs towards the camera 16. In addition, reflection coming from deep red and NIR external sources such as sun or environment will have reduced impact.

According to the invention, in both embodiments shown respectively in FIGS. 1 and 2, the ophthalmic lens 10 has a front face coated with a front interferential coating and a rear face coated with a rear interferential coating.

The mean reflectance of the rear interferential coating is lower than or equal to 2.5% for wavelengths ranging from 700 nm to a predetermined maximum wavelength lower than or equal to 2500 nm, at an angle of incidence lower than or equal to 45°.

In a particular embodiment, when the angle of incidence of deep red and NIR light is low i.e. not too far from normal incidence, typically when the light source is directed towards the front face of the ophthalmic lens, the mean reflectance of the rear interferential coating is lower than or equal to 2.5% for wavelengths ranging from 700 nm to a predetermined maximum wavelength lower than or equal to 2500 nm, at an angle of incidence lower than or equal to 35°. This allows minimizing deep red and NIR light reflection for an angle of incidence which is defined by the geometry of the ophthalmic lens and the light source.

In another particular embodiment, when the angle of incidence of deep red and NIR light is high, typically when the light source is directed towards the rear face of the ophthalmic lens, the mean reflectance of the rear interferential coating is lower than or equal to 2.5% for wavelengths ranging from 700 nm to a predetermined maximum wavelength lower than or equal to 2500 nm, at an angle of incidence comprised between 35° (included) and 45° (included). This allows minimizing deep red and NIR light reflection for an angle of incidence which is defined by the geometry of the ophthalmic lens and the light source located on the side of the head of the wearer.

This is therefore an antireflective coating, significantly reducing reflection in the deep red and NIR range, so that the camera 16 will receive little light coming from reflection on the lens 10.

This will ensure high quality measurement of the features of the eye 14, since limited noise light will be present. For instance, this makes it possible to obtain accurate and reliable eye position and iris or pupil size measurement. In the embodiment of FIG. 1, eye position can then be used for instance to modify the contents of the virtual image according to its position. Eye position can also be used as part of an MMI interface (Multi Media Interface) to drive an electronic system.

The above-mentioned predetermined maximum wavelength is 2500 nm, preferably 1400 nm, more preferably 980 nm, even more preferably 900 nm. As a non-limiting example, the range of interest for eye tracking is from 780 nm to 900 nm.

The mean reflectance of the rear interferential coating in the deep red and NIR region i.e. at wavelengths ranging from 700 nm to 2500 nm, noted $R_m^{NIR}2500$, is defined by the formula:

$$R_m^{NIR}2500 = \frac{\int_{700}^{2500} R(\lambda)d\lambda}{2500 - 700}$$

wherein $R(\lambda)$ represents the reflectance at a given wavelength $\lambda$.

In a more general manner, the mean reflectance of the rear interferential coating in the deep red and NIR region i.e. at wavelengths ranging from 700 nm to a predetermined wavelength A nm, noted $R_m^{NIR}A$, is defined by the formula:

$$R_m^{NIR}A = \frac{\int_{700}^{A} R(\lambda)d\lambda}{A - 700}$$

According to the invention, the mean reflectance $R_m^{NIR}$ of the front interferential coating is different, depending on whether the deep red and NIR light source is directed towards the front face or the rear face of the ophthalmic lens.

Namely, the deep red and NIR light source is directed towards the front face of the ophthalmic lens in the configuration of an augmented reality device or a virtual reality device as shown in FIG. 1, for instance, whereas it is directed towards the rear face of the ophthalmic lens in the configuration of an eye tracking device as shown in FIG. 2, for instance.

If the source is directed towards the front face of the ophthalmic lens, $R_m^{NIR}$ of the front interferential coating is lower than or equal to 2.5% for wavelengths ranging from 700 nm to the above-mentioned predetermined maximum wavelength, at an angle of incidence lower than or equal to 45°.

If the source is directed towards the rear face of the ophthalmic lens, $R_m^{NIR}$ of the front interferential coating is higher than or equal to 25% for wavelengths ranging from 700 nm to the above-mentioned predetermined maximum wavelength, at an angle of incidence lower than or equal to 45°.

In a particular embodiment, in addition, the luminous reflectance Rv of the front and rear interferential coatings is lower than 2.5%, preferably lower than 1%, more preferably lower than 0.75% in the visible range, that is to say for wavelengths ranging from 380 nm to 780 nm, at an angle of incidence lower than or equal to 45°.

The luminous reflectance Rv is as defined in the ISO 13666:1998 standard, i.e. this is the ratio of the luminous flux reflected by the material to the incident luminous flux over the whole visible spectrum i.e. between 380 nm and 780 nm.

Therefore, visible reflection is limited, both for light coming from the back of the wearer of the lens and for light reflecting on the front and rear faces of the lens.

This is particularly advantageous because it increases visual comfort by limiting reflection from the rear face of the lens and it improves aesthetics by reducing reflection perceived by observers.

In a particular embodiment, the rear interferential coating comprises at least four layers, each layer having a refractive index either lower than the refractive index of all the adjacent layers, or higher than the refractive index of all the adjacent layers. In other words, layers of alternating low and high refractive index materials are stacked.

In that embodiment, if the deep red and NIR light source is directed towards the front face of the ophthalmic lens, the front interferential coating also comprises at least four layers, each layer having a refractive index either lower than the refractive index of all the adjacent layers, or higher than the refractive index of all the adjacent layers.

In that embodiment, as a non-limiting example, the lens comprises a substrate that can be transparent or partially absorbing to visible light and transparent or partially absorbing to deep red and NIR light. In the direction moving away from the substrate, the interferential coating comprises at least:
one layer having a refractive index ranging from 1.6 to 2.4;
one layer having a refractive index lower than 1.6;
one layer having a refractive index ranging from 1.6 to 2.4;
one layer having a refractive index lower than 1.6.

In that embodiment, the layers having a refractive index ranging from 1.6 to 2.4 can for example be made of zirconia ($ZrO_2$) and the layers having a refractive index lower than 1.6 can for example be made of silicon dioxide ($SiO_2$).

In that embodiment, as a non-limiting example, in the direction moving away from the substrate, the lens comprises at least:
one layer having a physical thickness ranging from 10 to 25 nm;
one layer having a physical thickness ranging from 20 to 35 nm;
one layer having a physical thickness ranging from 140 to 180 nm;
one layer having a physical thickness ranging from 90 to 120 nm.

In that embodiment, as non-limiting examples, the physical thickness of the rear interferential coating or the physical thickness of the front interferential coating (always if the deep red and NIR light source is directed towards the front face of the ophthalmic lens) is lower than or equal to 500 nm, preferably lower than or equal to 320 nm and is typically ranging from 260 to 320 nm.

In a particular embodiment, if the deep red and NIR light source is directed towards the rear face of the ophthalmic lens, the front interferential coating comprises at least six layers. In the direction moving away from the substrate, the front interferential coating comprises at least:
one layer having a refractive index ranging from 1.6 to 2.2;
one layer having a refractive index larger than or equal to 2.2;
one layer having a refractive index lower than or equal to 1.6;

one layer having a refractive index larger than or equal to 2.2;

one optional layer having a refractive index ranging from 1.6 to 2.2; and one layer having a refractive index lower than or equal to 1.6.

In that embodiment, the layers having a refractive index ranging from 1.6 to 2.2 can for example be made of zirconia ($ZrO_2$), the layers having a refractive index lower than 1.6 can for example be made of silicon dioxide ($SiO_2$) and the layers having a refractive index larger than 2.2 can for example be made of titanium dioxide ($TiO_2$).

In that embodiment, as a non-limiting example, in the direction moving away from the substrate, the lens comprises at least:

one layer having a physical thickness ranging from 31 to 54 nm;

one layer having a physical thickness ranging from 74 to 98 nm;

one layer having a physical thickness ranging from 165 to 190 nm;

one layer having a physical thickness ranging from 87 to 98 nm;

one optional layer having a physical thickness ranging from 0 to 10 nm; and one layer having a physical thickness ranging from 64 to 85 nm.

Unless otherwise specified, the refractive indices referred to in the present application are expressed at 25° C. at a wavelength of 550 nm.

In a particular embodiment, the ophthalmic lens 10 may include a hard coating to increase its abrasion resistance. In such an embodiment, the refractive index of the substrate will advantageously be similar to the refractive index of the hard coating, in order to reduce fringes coming from a mismatch between refractive indices. Fringes may indeed also reduce image quality for eye features measurement, since they provide variation of intensity, in particular when using high coherence light, which is the case when using NIR light having a narrow wavelength bandwidth.

The following examples illustrate the present invention in a non-limiting manner.

EXAMPLES

1. General Procedures

The ophthalmic lens used in the example comprises a lens substrate having a refractive index of 1.60 (MR-8® lens from MITSUI), coated with a 3 μm thick hard coat having a refractive index of 1.59.

An antireflective coating according to the present invention is deposited on the rear face of the lens.

In addition, for uses where the deep red and NIR light source is directed towards the front face of the lens, an antireflective coating according to the present invention is also deposited on the front face of the lens.

On the other hand, for uses where the deep red and NIR light source is directed towards the rear face of the lens, a reflective coating according to the present invention is deposited on the front face of the lens.

The layers of the antireflective and reflective coatings were deposited without heating the substrates by evaporation under vacuum (evaporation source: electron gun).

The deposition frame is a Leybold 1104 machine fitted with an electron gun (ESV14 (8 kV)) for evaporating oxides, and provided with an ion gun (Commonwealth Mark II) for the preliminary phase to prepare the surface of the substrate using argon ions (IPC).

The thickness of the layers was controlled by means of a quartz microbalance. The spectral measurements were effected on a variable incidence-spectrophotometer Perkin-Elmer Lambda 850 with an URA accessory (Universal Reflectance Accessory).

2. Test Procedure

The method for making the ophthalmic lens comprised in the optical device according to the invention comprises a step of introducing the substrate, possibly coated on its rear or front face with a conventional anti-abrasion and scratch-resistant coating, into a vacuum deposition chamber, a step of pumping until a high-vacuum is obtained, a step of activating the surface of the substrate by means of an argon ion beam, turning the ion irradiation off, then forming subsequently the various layers of the antireflective and reflective coatings by successive evaporations and at last a ventilation step.

3. Results

The structural characteristics and the optical performances of the ophthalmic lens obtained with the interferential coating of Example 1 on the rear face of the lens are detailed hereunder.

Figure 3:
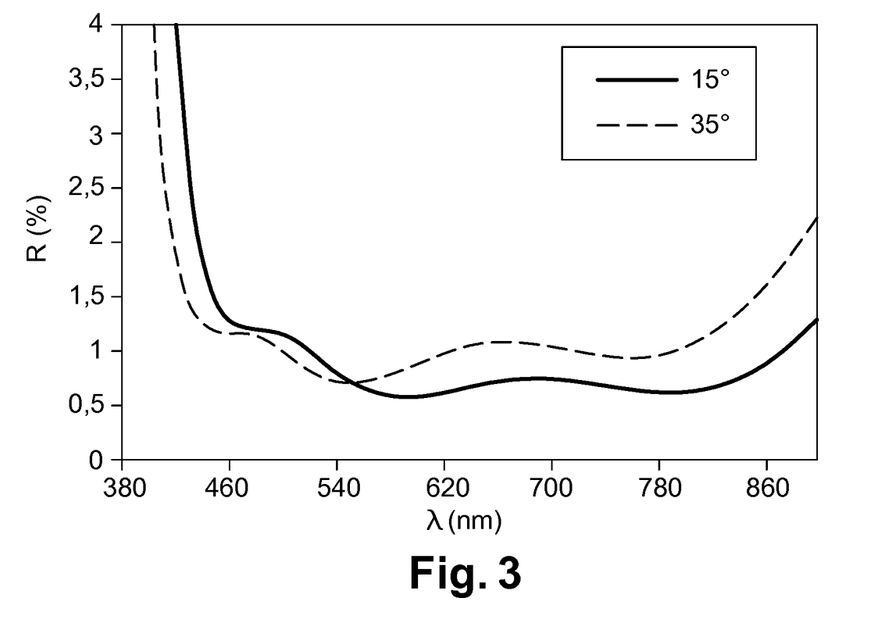
FIG. 3 is a set of graphs showing the variation of reflectance (R %) of the rear face of a lens prepared in Example 1 of the present application at angles of incidence of 15° and 35° as a function of the light wavelength $\lambda$ in a range between 380 nm and 900 nm.
Figure 4:
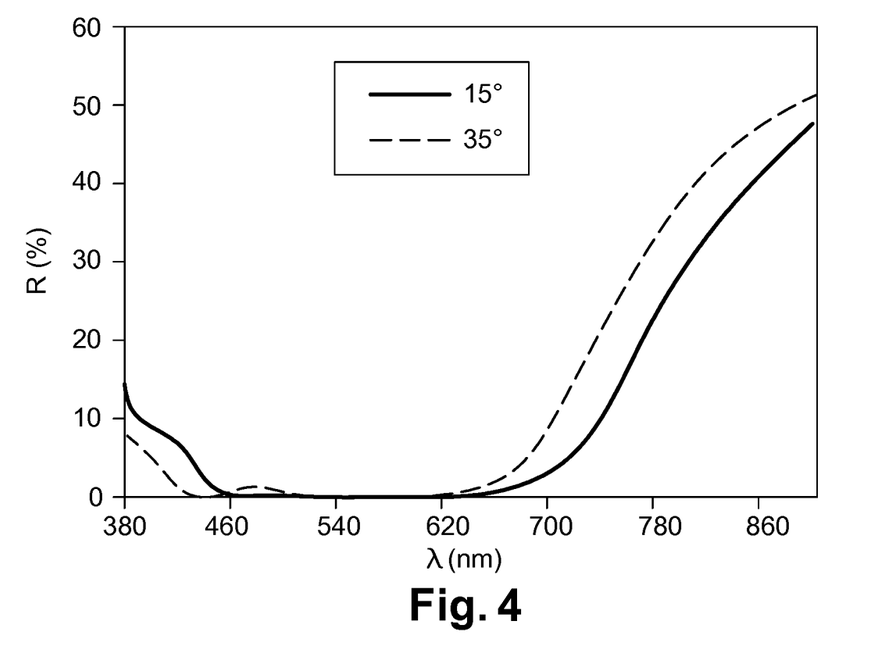
FIG. 4 is a set of graphs showing the variation of reflectance (R %) of the front face of a lens prepared in Example 2 of the present application at angles of incidence of 15° and 35° as a function of the light wavelength $\lambda$ in a range between 380 nm and 900 nm.

The reflection graphs between 380 nm and 900 nm with angles of incidence of 15° and 35° are illustrated by FIG. 3.

The optical values are those of the rear face.

The Chroma (C*) and hue angle (h*) of reflected light are provided for angles of incidence of 15° and 35°, a standard illuminant D65 and a standard observer (angle 10°).

Rv is the luminous reflectance calculated from 380 nm to 780 nm.

| | Example 1 | |
|---|---|---|
| Material | Refractive index | Physical thickness (nm) |
| Air | 1.00000 | |
| $SiO_2$ | 1.47300 | 104.64 |
| $ZrO_2$ | 1.99700 | 158.01 |
| $SiO_2$ | 1.47300 | 29.34 |
| $ZrO_2$ | 1.99700 | 20.91 |
| Substrate + Hard Coat | 1.59260 | |

| Angle of incidence 15° | | Angle of incidence 35° | |
|---|---|---|---|
| Rv | 0.83% | Rv | 0.85% |
| L* | 7.46 | L* | 7.65 |
| C*(ab) | 13.4 | C*(ab) | 7.5 |
| h*(ab) | −74 | h*(ab) | −58 |
| $R_m^{NIR}900$ | 0.76% | $R_m^{NIR}900$ | 1.26% |

The same interferential coating as in Example 1 has been deposited on the front face of the ophthalmic lens in a realization of the embodiment of FIG. 1. In Example 1, the mean reflectance on both the rear and the front faces of the lens for wavelengths ranging from 700 nm to 900 nm is lower than or equal to 2.5%, even lower than 1%. With such properties, noise reflections are avoided.

Another interferential coating detailed hereunder in Example 2 has been deposited on the front face of the ophthalmic lens in a realization of the embodiment of FIG. 2, with a hard coat different from the one on the rear face, having a refractive index of 1.479 and a thickness of 3 μm.

| Example 2 | | |
|---|---|---|
| Material | Refractive index | Physical thickness (nm) |
| Air | 1.00000 | |
| SiO$_2$ | 1.474 | 74.43 |
| ZrO$_2$ | 1.997 | 6.73 |
| TiO$_2$ | 2.408 | 89.27 |
| SiO$_2$ | 1.474 | 171.21 |
| TiO$_2$ | 2.408 | 82.83 |
| ZrO$_2$ | 1.997 | 47.92 |
| Substrate + Hard Coat | 1.479 | |
| Angle of incidence 15° | | |
| Rv | 0.2% | |
| C*(ab) | 29 | |
| h*(ab) | 304 | |
| R$_m^{NIR}$900 | 27.1% | |

In Example 2, the mean reflectance on the rear face of the lens for wavelengths ranging from 700 nm to 900 nm is lower than or equal to 2.5%, even lower than 1%; and the mean reflectance on the front face of the lens for wavelengths ranging from 700 nm to 900 nm is higher than 25%. With such properties, light directed towards the rear face of the lens is reflected by the front face of the lens only, and low reflection on the rear face avoids noise reflections.

Although representative processes and articles have been described in detail herein, those skilled in the art will recognize that various substitutions and modifications may be made without departing from the scope of what is described and defined by the appended claims.

The invention claimed is:

1. An optical device comprising:
an ophthalmic lens and a light source emitting in a deep red and near infrared region, said ophthalmic lens having a front face coated on a top thereof with a front interferential coating and a rear face coated on a top thereof with a rear interferential coating, wherein a mean reflectance of said rear interferential coating is lower than or equal to 2.5% for wavelengths ranging from 700 nm to a maximum wavelength lower than or equal to 2500 nm, at an angle of incidence lower than or equal to 45°; and
the mean reflectance of said front interferential coating is either:
lower than or equal to 2.5% for wavelengths ranging from 700 nm to said maximum wavelength, at an angle of incidence lower than or equal to 45°, if said source is directed towards said front face of said ophthalmic lens, or
higher than or equal to 25% for wavelengths ranging from 700 nm to said maximum wavelength, at an angle of incidence lower than or equal to 45°, if said source is directed towards said rear face of said ophthalmic lens.

2. The optical device according to claim 1, wherein said maximum wavelength is 2500 nm.

3. The optical device according to claim 1, wherein said maximum wavelength is 1400 nm.

4. The optical device according to claim 1, wherein said maximum wavelength is 980 nm.

5. The optical device according to claim 1, wherein said maximum wavelength is 900 nm.

6. The optical device according to claim 1, wherein a luminous reflectance Rv of said front and rear interferential coatings is lower than 2.5% in a visible range for wavelengths ranging from 380 nm to 780 nm, at an angle of incidence lower than or equal to 45°.

7. The optical device according to claim 1, wherein (i) said rear interferential coating or (ii) said front interferential coating if said source is directed towards said front face of said ophthalmic lens, comprises at least four layers, each layer having a refractive index either lower than the refractive index of all adjacent layers, or higher than the refractive index of all the adjacent layers.

8. The optical device according to claim 7, wherein said lens comprises a substrate and in that (i) said rear interferential coating or (ii) said front interferential coating if said source is directed towards said front face of said ophthalmic lens, comprises at least, in the direction moving away from said substrate:
one layer having a refractive index ranging from 1.6 to 2.4;
one layer having a refractive index lower than 1.6;
one layer having a refractive index ranging from 1.6 to 2.4; and
one layer having a refractive index lower than 1.6.

9. The optical device according to claim 7, wherein said lens comprises a substrate and in that (i) said rear interferential coating or (ii) said front interferential coating if said source is directed towards said front face of said ophthalmic lens, comprises at least, in the direction moving away from said substrate:
one layer having a physical thickness ranging from 10 to 25 nm;
one layer having a physical thickness ranging from 20 to 35 nm;
one layer having a physical thickness ranging from 140 to 180 nm; and
one layer having a physical thickness ranging from 90 to 120 nm.

10. The optical device according to claim 1, wherein a physical thickness of (i) said rear interferential coating or (ii) said front interferential coating if said source is directed towards said front face of said ophthalmic lens, is lower than or equal to 500 nm.

11. The optical device according to claim 8, wherein said layers having a refractive index ranging from 1.6 to 2.4 are made of zirconia (ZrO$_2$) and said layers having a refractive index lower than 1.6 are made of silicon dioxide (SiO$_2$).

12. The optical device according to claim 1, wherein said ophthalmic lens is a corrective lens.

13. An augmented reality device comprising the optical device according to claim 1.

14. A virtual reality device comprising the optical device according to claim 1.

15. An eye tracking device comprising the optical device according to claim 1.

16. The optical device according to claim 1, wherein a luminous reflectance Rv of said front and rear interferential coatings is lower than 1% in a visible range for wavelengths ranging from 380 nm to 780 nm, at an angle of incidence lower than or equal to 45°.

17. The optical device according to claim 1, wherein a luminous reflectance Rv of said front and rear interferential coatings is lower than 0.75% in a visible range for wavelengths ranging from 380 nm to 780 nm, at an angle of incidence lower than or equal to 45°.

18. The optical device according to claim 1, wherein a physical thickness of (i) said rear interferential coating or (ii) said front interferential coating if said source is directed towards said front face of said ophthalmic lens, is lower than or equal to 320 nm.

19. The optical device according to claim 1, wherein a physical thickness of (i) said rear interferential coating or (ii) said front interferential coating if said source is directed towards said front face of said ophthalmic lens, is ranging from 260 to 320 nm.

20. An optical device comprising:
an ophthalmic lens and a light source emitting in a deep red and near infrared region, said ophthalmic lens having a front face coated with a front interferential coating and a rear face coated with a rear interferential coating, wherein a mean reflectance of said rear interferential coating is lower than or equal to 2.5% for wavelengths ranging from 700 nm to a maximum wavelength lower than or equal to 2500 nm, at an angle of incidence lower than or equal to 45°; and
the mean reflectance of said front interferential coating is either:
lower than or equal to 2.5% for wavelengths ranging from 700 nm to said maximum wavelength, at an angle of incidence lower than or equal to 45°, if said source is directed towards said front face of said ophthalmic lens, or
higher than or equal to 25% for wavelengths ranging from 700 nm to said maximum wavelength, at an angle of incidence lower than or equal to 45°, if said source is directed towards said rear face of said ophthalmic lens,
wherein a physical thickness of (i) said rear interferential coating or (ii) said front interferential coating if said source is directed towards said front face of said ophthalmic lens, is ranging from 260 to 320 nm.

* * * * *